United States Patent [19]
Tesch

[11] Patent Number: 5,547,731
[45] Date of Patent: Aug. 20, 1996

[54] NEEDLED CARPET AND A PROCESS FOR PRODUCING IT

[76] Inventor: Gunter Tesch, Ave. Jean-Marie Musy 15, Ch-1700 Fribourg, Switzerland

[21] Appl. No.: 182,166
[22] PCT Filed: May 25, 1993
[86] PCT No.: PCT/EP93/01315
§ 371 Date: Jan. 25, 1994
§ 102(e) Date: Jan. 25, 1994
[87] PCT Pub. No.: WO93/24696
PCT Pub. Date: Dec. 9, 1993

[30] Foreign Application Priority Data

May 26, 1992 [DE] Germany .......................... 42 17 439.2
May 26, 1992 [DE] Germany .......................... 42 17 440.6
May 26, 1992 [DE] Germany .......................... 42 17 442.2

[51] Int. Cl.⁶ .............................. B32B 3/02; B32B 5/16; D04M 1/46
[52] U.S. Cl. ............................. 428/85; 428/95; 428/282; 428/283; 428/296; 28/112; 156/72; 156/148
[58] Field of Search .............................. 428/85, 95, 282, 428/296, 283; 28/112; 156/72, 148

[56] References Cited

U.S. PATENT DOCUMENTS

| | | | |
|---|---|---|---|
| 3,818,817 | 6/1974 | Pickens, Jr. et al. | 428/95 |
| 3,935,046 | 1/1976 | Kiernan et al. | 428/282 |
| 3,952,126 | 4/1976 | Dycks | 428/235 |
| 4,062,993 | 12/1977 | Seward | 428/93 |
| 4,096,302 | 6/1978 | Thibodeau et al. | 428/95 |
| 4,199,635 | 4/1980 | Parker | 428/95 |
| 4,342,802 | 8/1982 | Pickens, Jr. et al. | 428/85 |
| 4,389,443 | 1/1983 | Thomas et al. | 428/95 |
| 4,495,235 | 1/1985 | Tesch | 428/282 |
| 4,522,876 | 1/1985 | Hiers | 428/282 |
| 4,725,476 | 2/1988 | Mussallem, III | 428/282 |
| 5,080,951 | 1/1992 | Guthrie | 428/282 |

FOREIGN PATENT DOCUMENTS 388072 9/1990 European Pat. Off. .

Primary Examiner—Terrel Morris
Attorney, Agent, or Firm—Bacon & Thomas

[57] ABSTRACT

A process for producing a needled multilayered carpet is described in which an intermediate layer (6) containing thermoplastic film material is arranged between a layer of backing (5) and a top layer (7). The three layers are bonded together into a carpet by means of a process of needling through fibers (9). The intermediate layer (6) is formed by lumpy, three-dimensional plastic film material (8), and the needled fibers are tightly integrated into the intermediate layer (6) by the influence of temperature.

14 Claims, 1 Drawing Sheet 5,547,731

NEEDLED CARPET AND A PROCESS FOR PRODUCING IT

FIELD OF THE INVENTION

The invention concerns a needled multilayered carpet and a process for producing such a needled carpet.

BACKGROUND OF THE INVENTION

The known needled multilayered carpets have a backing of film or woven tape. An intermediate layer of fibers is arranged on this backing, which is covered by a top layer of carpet made of better fibers that are visible in use. These three layers are needle-punched together, and fibers from the top layer are needle-punched into the intermediate layer and the backing.

The bottom or intermediate layer make the carpet thicker, for one thing, and for another, the intermediate layer is used to achieve a better hold for the fibers needled through from the top layer of the carpet. As a rule, this intermediate layer is 2–3 mm thick. Although cheaper fibers are used for the intermediate layer, substantial costs are involved in processing these fibers.

After being needled, the fibers in the intermediate layer are tightly integrated by impregnating the carpet with a binder, like latex, or at least slop-padded from beneath up to the upper edge of the intermediate layer. This way, the fibers in the top layer of the carpet are reinforced and anchored fast, so they cannot be pulled out as the carpet is used. The process of drying a carpet produced in this process is expensive in terms of time and energy. Large machinery is required, and the process must be closely supervised. Integrating the latex into the carpet and cross-linking it represents a large and hence onerous production expense, and special drainage and ventilation problems occur. These carpets also have the disadvantage that old carpets are very difficult to dispose of, since the latex components are very difficult to separate from the other components in the carpet, and the ratio of elastomers to total raw materials is bound to be non-uniform, for the most part.

Many attempts have been made to improve or optimize the properties of needled-felt carpets. Thus, it is known from AT 305 942, how to put a thermoplastic film between the top and bottom layer, which is bonded to the top and bottom layer by needling, and then surround it with a foamed PVC paste in such a way that the film disappears in it.

The use of polyethylene films processed with needled felt is known from DEZ Chemiefaser 2/69, pp. 103–106. These films are used in order to improve the expansion properties of the carpets produced with them.

In the carpet known from DE OS 22 19817, strips of polypropylene are used as woven tape.

But none of the carpets disclosed in the documents named eliminate the disadvantages mentioned at the beginning of complicated, expensive and environmentally harmful production processes.

SUMMARY OF THE INVENTION

The task of the invention is to design a process whereby a needled multilayered carpet is produced so that latex need no longer be used and production time is cut substantially compared to the known processes.

This task is solved by process and by the needled carpet as claimed herein.

According to the invention, lumpy, three-dimensional thermoplastic film material is used as an intermediate layer. The film material used is "volume-enhanced," so that it provides a three-dimensional material as opposed to a planar intermediate layer. It can be "volume-enhanced" pieces such as film with a nap or cam, in which the planes have projecting bumps or strips or pieces of film, whose volume is increased particularly by coiling, curling, stamping and the like. As noted, pieces of film may be with bumps, like nap, cams, deep-drawn parts or bumps produced by stretching in many sub-areas, especially small sub-areas in the film pieces. The film material is especially easy to handle; it can be layered during the production process into uniform layers by being thrown off of a delivery device. If a number of such parts, strips or pieces of film lie one on top of the other prior needling, together they take up a very large volume, which corresponds to many times the volume of the smooth or flat film material formed. The lumpy three-dimensional, non-needled film material (8) is deposited in a volume which is at least twice and a minimum of ten times as large as the volume of the smooth or flat film material formed by the process of the present invention. Even after needling and hot-fixing this three-dimensional, multilayer film material, the intermediate layer of such a carpet, due to deflection of the fibers in the intermediate layer, provides much more damping than if only several flat or smooth films are used. Layering the films loosely makes the needling easier.

During the needling cycle, the intermediate layer of carpet is compressed by softening and partially melting the plastic film at a high temperature, which tightly integrates the fibers. Furthermore, the carpet to be produced is already exposed to the effect of pressure during the needling process; the intensity of the pressure depends on the parameters used in the process and the needling machine. This results in greater compression and fixing of the intermediate layer, and hence tight integration of the fibers into the intermediate layer.

It is advantageous if such needled carpet is heated, with the lumpy film material at least softened or melted, and pressed between at least two rollers. Here, in particular, the fibers needled into and through the intermediate layer are deflected from their perpendicular direction and pressed between surfaces of layers of the film material piled one on top of the other. Not only are the individual layers of the film glued fast to the film material, but also the needled fibers. This way, the fibers are held fast through the intermediate layer so that fixing them with latex or the like is no longer necessary. The fibers in the upper layer, which may have been pressed down by the roller, can then be brushed or steamed, for example, so they stand up again.

Especially when polypropylene fibers and polyolefin films are used, there is good surface bonding between the fibers and the plastic films. But polyamide or polyester fibers and a film material that adheres well to these fibers is also suitable. The important thing is that the melting point of the fibers in the top layer is above the melting point of the film material, so that when the carpet is heated and pressed, only the film is melted or adhered and, if necessary, agglomerated. This is true, for example, of polypropylene fibers with a melting point around 170° C. and high-pressure polyethylene films with a melting point around 110° C.

The fibers in the top layer can also be in the form of balls like so-called fiber balls, from which individual fibers are drawn for the needling process. For example, an intermediate layer of film with 800 g per square meter and a layer of fiber balls with 300 g per square meter can be laid on a backing of polypropylene strips, both layers needled to the backing and then set by heat and pressure. With a layer consisting of fiber balls, fewer fibers are needled into the film and backing than with a top layer, which is used, for example, to produce a needled felt carpet. The balls are twisted like yarn; not all fibers in the ball have to be needled into the film layer as with needled felt, only those used to hold the ball. Despite this, there is an excellent bond between the top layer and the ball of fibers because the layer of film is used.

Since uneven film material is used, according to one special embodiment of the invention, it is possible to use waste film as the material for the intermediate layer, at least in large part There are such large quantities of waste material that its disposal causes huge difficulties. The process according to the invention can therefore improve the disposal of waste film.

Later on, when it is no longer used, such a needled carpet consisting only of certain plastics can be much more easily recycled than a needled carpet coated with latex. In addition, such carpets are less susceptible to funguses and microbes, since they are completely synthetic.

A needled carpet produced according to the process in the invention is described as follows. The needled carpet of the present invention comprises a layer of backing, a top layer forming the visible side of the carpet and an intermediate layer containing pieces of thermoplastic film material arranged in between, whereby the three layers are needled together by means of fibers taken at least from the top layer, characterized by the fact that the intermediate layer (6) is formed by lumpy, three-dimensional, needled plastic film material (8) and that the needled fibers (9) are tightly integrated into the intermediate layer (6). This needled carpet may be further characterized by the fact that the intermediate layer (6) has several layers of lumpy film material (8). The intermediate layer (6) may also consist of pieces of film (8) having fibers, especially natural or synthetic fibers mixed in with it. In addition, the intermediate layer (6) may have pieces of cut-up flooring mixed in with it. Particularly good results in terms of usage properties, especially soundproofing and insulation, were able to be achieved by mixing already processed or cut-up floor covering material in the intermediate layer. The material added to the pieces of film, at the rate of 30–50% in term of volume, approximately, was needled to the material in the intermediate layer. The size of the pieces of cut-up flooring material is such that it was well integrated through and in between the pieces of film.

DESCRIPTION OF THE DRAWINGS

Other details and advantages will emerge from the example of embodiment described along with the drawings, in which.

DETAILED DESCRIPTION

Figure 1:
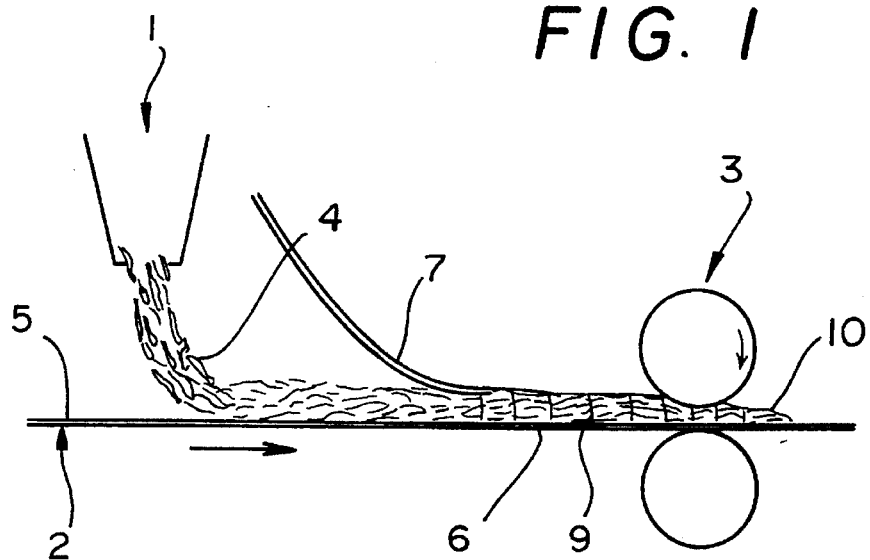
FIG. 1 shows a schematic representation of a system for producing the needled carpet in the invention.
Figure 2:
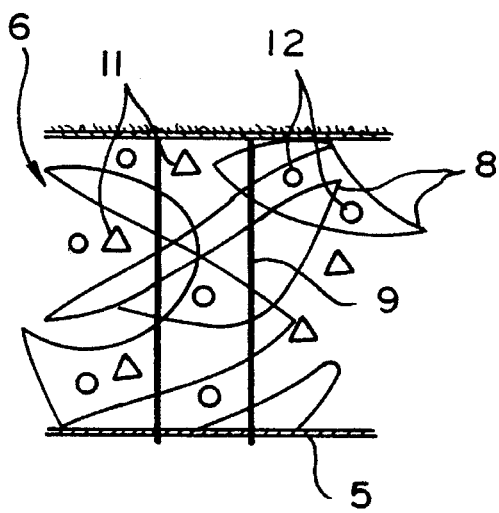
FIG. 2 shows a schematic representation of a needled carpet.
Figure 3:
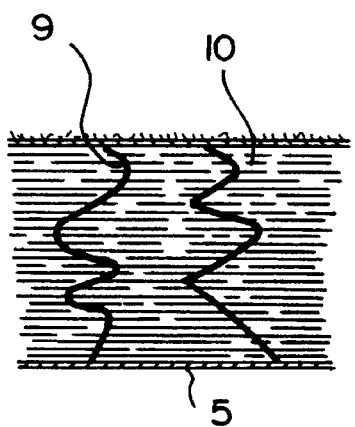
FIG. 3 shows a schematic representation of the needled carpet in FIG. 2 after the roller cycle.
Figure 4:
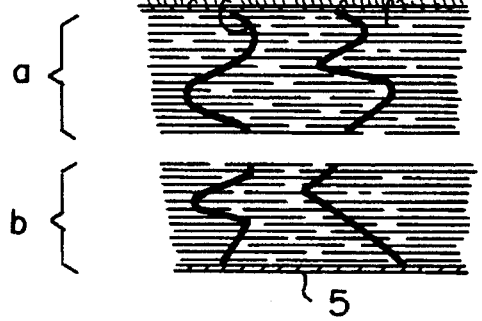
FIG. 4 shows an expanded schematic representation of the needled carpet of FIG. 2 having multiple layers.

A system for producing the needled carpet in the invention has a delivery device 1, a conveyor device 2 and a roller device 3. The pieces or strips of film 4 fed to the delivery device 1 are deposited on a backing 5 and layered in at least one layer as shown in FIG. 3 or more layers as depicted in FIG. 4. An intermediate layer 6 created in this way is covered by a top layer 7, which consists of a fibrous material containing needled or sewn fibers. This material can be carpet fibers or balls. The intermediate layer 6 is then needled to the backing 5 with the fibers 9 taken from the top layer 7. A schematic representation of the needled intermediate layer 6 can be seen in FIG. 2. The three-dimensional pieces of film 8 forming the intermediate layer 6 form a loose structure which the needles can penetrate well with the fibers 9 of the top layer 7. The lumps (12) are also shown in FIG. 2 as are the other materials (11) contained in the layer. The vertical needling direction and the way the fibers run 9 can be seen in FIG. 2. Carpet needle-punched in this way then conveniently runs through the roller device 3, in which it is heated, preferably from the backing side. This softens the film 8 in the intermediate layer 6 and tends to make it agglomerate. This effect is also supported by the effect of pressure from the roller device 3, i.e., the films 8 are compressed by the roller process, so that a compact structure 10 is created in the intermediate layer 6. The fibers 9 of the top layer are tightly anchored in a basically uniform film material 10, so that they can practically no longer be pulled out of the finished carpet.

FIG. 3 also shows as an optional feature multiple internal layers (a) and (b).

An example should explain in greater detail the material composition of a carpet produced in this way: waste films 20 μm to 50 μm thick by roughly 15 mm ×40 mm are laid one on top of the other, so that a layer of pieces of film of roughly 1000 g per square meter is created. This forms a film layer roughly 15 to 35 mm thick. This intermediate layer can also consist of film of various sizes; after sufficient mixing, the various pieces of film are distributed roughly evenly throughout.

The needled carpets produced according to the process in the invention have good soundproofing properties, are easy to care for and are durable. They can also be treated wet. In addition, because of the particularly good fiber bond, they are also firm and do not bleed.

What is claimed is:

1. A process for producing a needled carpet which comprises forming an intermediate layer between a backing layer and a top layer, the intermediate layer being formed by depositing a plurality of pieces of a lumpy thermoplastic film onto the backing layer to form a loose structure, said top layer containing fibers which have a melting point above the melting point of the pieces of thermoplastic film forming the intermediate layer, needle bonding the top layer and intermediate layer to force fibers from the top layer into the intermediate layer and applying sufficient heat to bond the fibers tightly in the intermediate layer.

2. The process according to claim 1 comprising the further step of compressing the intermediate layer by pressure, wherein the compressing step takes place after needle bonding and before, during or after the heating step.

3. The process according to claim 1 wherein the heating step comprises heating the carpet to achieve at least partial softening of the lumpy film material and then pressing the film material between two rollers.

4. The process according to claim 3 wherein the fibers needled into the intermediate layer are deflected from their perpendicular direction.

5. The process according to claim 1 wherein the lumpy, three-dimensional, non-needled film material is deposited in a volume between twice and ten times as large as the volume of the resulting carpet.

6. The process according to claim 5 wherein the three-dimensional film material comprises pieces of film with bumps, nap, cams, deep-drawn parts or bumps produced by stretching in many subareas.

7. The process according to claim 1 wherein the lumpy plastic film material originates from waste film.

8. The process according to claim 1 wherein several layers of lumpy film material are deposited as an intermediate layer.

9. The process according to claim 8 wherein the intermediate layer further comprises pieces of already processed floor covering material mixed in with the pieces of lumpy film material.

10. The process according to claim 8, wherein the intermediate layer further comprises pieces of already processed floor covering material layered on top of the film material.

11. A needled carpet comprising in order:

a backing layer;

an intermediate layer containing a plurality of pieces of lumpy thermoplastic film; and a fibrous top layer forming the visible side of the carpet, wherein the three layers are needled together such that fibers from the top layer penetrate through the intermediate layer and into the backing layer and wherein the fibers are heat bonded into the intermediate layer, the melting point of the fibers of the top layer being greater than the melting point of the plurality of film pieces of the intermediate layer.

12. The needled carpet according to claim 11, wherein the intermediate layer further comprises several layers of pieces of lumpy film material.

13. The needled carpet according to claim 11, wherein the intermediate layer further comprises fibers mixed with the pieces of film.

14. The needled carpet according to claim 11, wherein the intermediate layer further comprises pieces of cut-up flooring mixed with the pieces of film.

* * * * *